United States Patent [19]

Mongiols

[11] Patent Number: 5,293,039
[45] Date of Patent: Mar. 8, 1994

[54] SANDWICHED FIBER-OPTIC PRESSURE DETECTOR

[75] Inventor: Mireille Mongiols, Tours sur Meymont, France

[73] Assignee: Opto Industrie, Tours Sur Meymont, France

[21] Appl. No.: 27,358

[22] Filed: Mar. 8, 1993

[30] Foreign Application Priority Data

Mar. 26, 1992 [FR] France ............ 92 03677

[51] Int. Cl.$^5$ ............................. H01J 5/16
[52] U.S. Cl. ................ 250/227.16; 250/227.14; 385/13
[58] Field of Search ........... 250/227.14–227.19, 250/227.11, 231.19, 231.1, 221; 385/13; 340/555

[56] References Cited

U.S. PATENT DOCUMENTS

| | | | |
|---|---|---|---|
| 4,560,016 | 12/1985 | Ibancz et al. | 250/227.16 |
| 4,581,527 | 4/1986 | Crane et al. | 250/227.14 |
| 4,603,252 | 7/1986 | Malek et al. | 250/227.14 |
| 4,733,068 | 3/1988 | Thiele et al. | 250/227.14 |
| 4,781,056 | 11/1988 | Noel et al. | 250/227.14 |
| 4,830,449 | 5/1989 | Spillman, Jr. | 250/231.19 |
| 4,990,769 | 2/1991 | Hazan et al. | 250/227.16 |
| 5,056,884 | 10/1991 | Quinlan, Jr. | 385/13 |
| 5,084,615 | 1/1992 | Tracey | 25/227.16 |
| 5,134,386 | 7/1992 | Swanic | 250/227.16 |
| 5,193,129 | 3/1993 | Kramer | 250/227.14 |

FOREIGN PATENT DOCUMENTS 3247574 6/1984 Fed. Rep. of Germany.
2145515A 3/1985 United Kingdom.

OTHER PUBLICATIONS

Bertholds et al. "High–Resolution Photoelastic Pressure Sensor Using Low-Birefringence Fiber", Applied Optics, vol. 25, No. 3, Feb. 1986, pp. 340–343.
Sensors and Actuators, vol. 20, No. 3, Dec. 1, 1989, Lausanne, CH.

*Primary Examiner*—Michael Messinger
*Attorney, Agent, or Firm*—Frishauf, Holtz, Goodman & Woodward

[57] ABSTRACT

The invention relates to a fiber-optic pressure detector comprising a mat having an optical fiber running therethrough along a path with no fiber-fiber crossovers, which fiber is associated with a light source and a light receiver. The light receiver receives light flux transmitted by the optical fiber from the source, thereby showing up any changes to which the flux is subjected because of deformation to the optical fiber caused by a pressure force being applied to the mat, thereby enabling said force to be detected. The optical fiber is mounted on a support sheet made of plastic, and it passes back-and-forth through the support sheet via through holes, said support sheet being sandwiched between two other sheets of greater or lesser rigidity depending on the sensitivity desired for the detector mat.

10 Claims, 3 Drawing Sheets

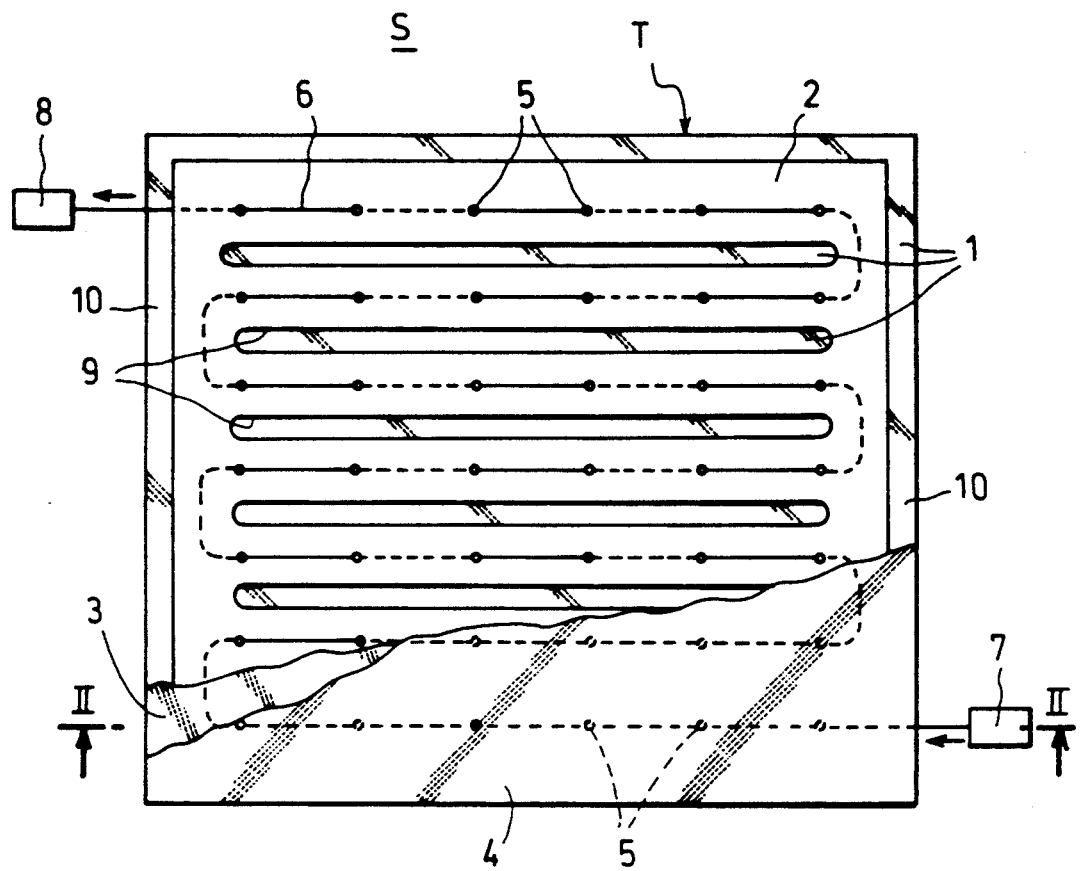
Fig_1
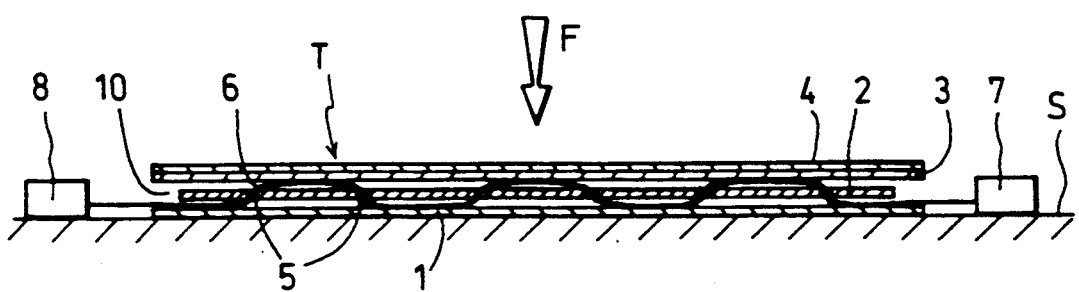
Fig_2

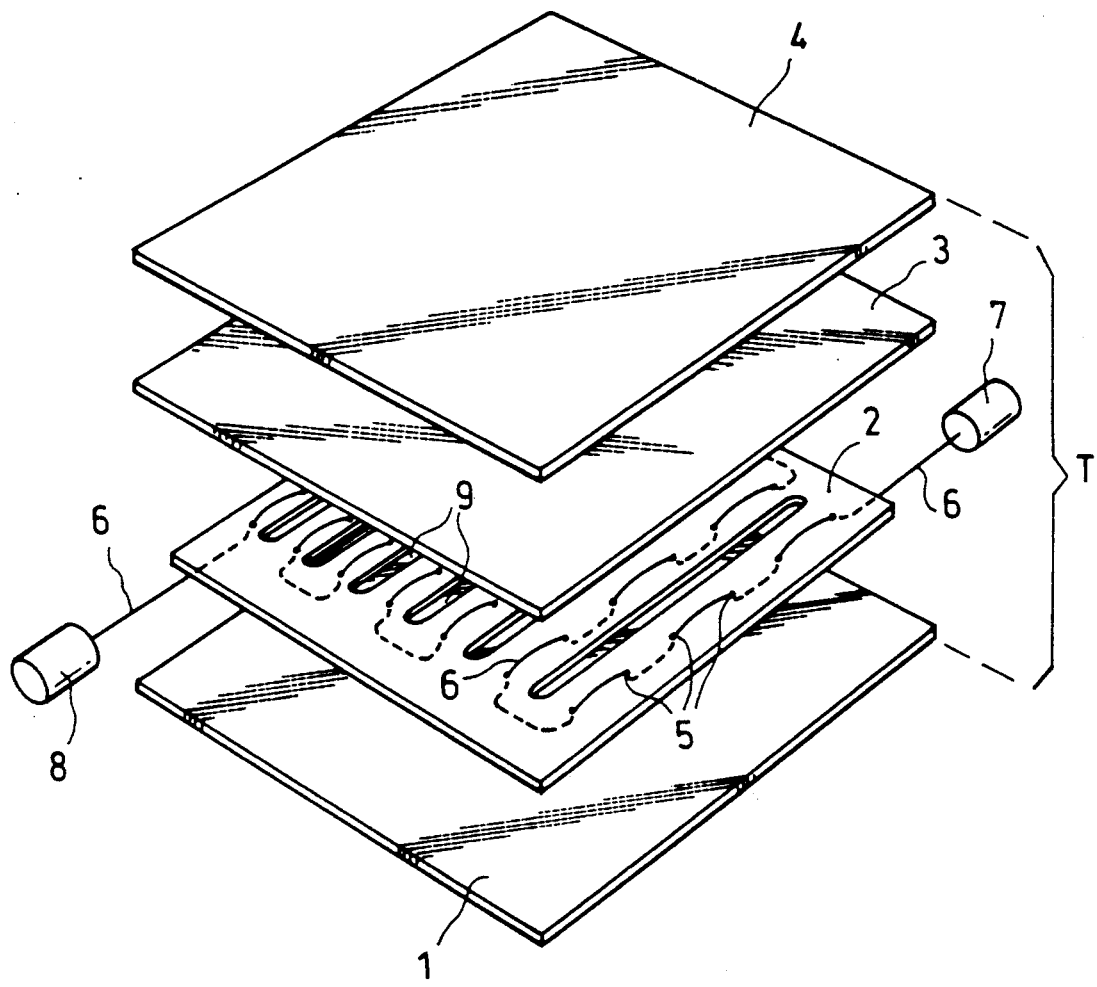
Fig_3

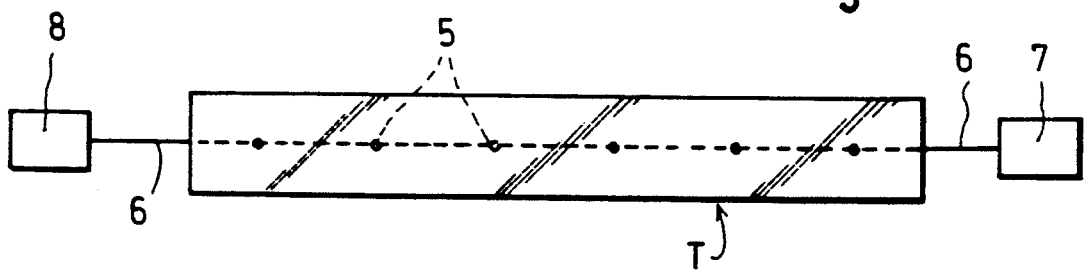
Fig_4
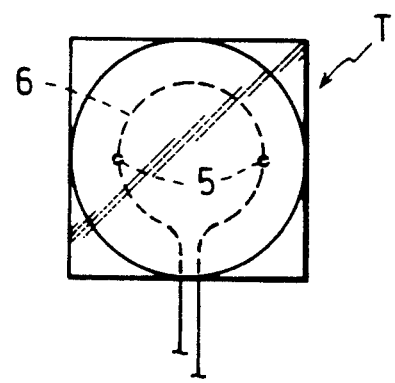
Fig_5
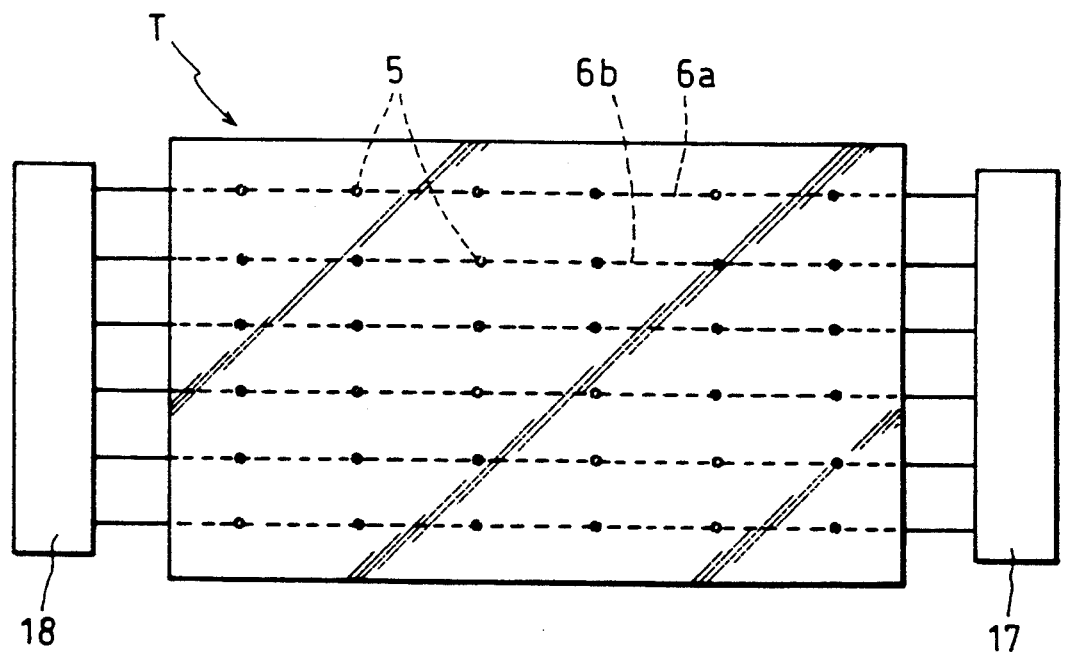
Fig_6

SANDWICHED FIBER-OPTIC PRESSURE DETECTOR

The present invention relates to a fiber-optic pressure detector, including a mat which comprises two superposed main sheets between which an optical fiber runs following a path that has no fiber-fiber crossovers, which fiber is associated with a source of light and with a light receiver, the receiver picking up the light flux transmitted by the optical fiber from the light source so as to show up the changes therein due to deformation of the optical fiber caused by the application of a pressure force to the mat, thereby enabling said force to be detected.

BACKGROUND OF THE INVENTION

A detector mat of this kind is known in which the optical fiber is directly interposed between the two main sheets, one of which provides a furrow for receiving the optical fiber, for the purpose of guiding the fiber along the path which it is to follow.

Such a structure is difficult to implement and leads to a manufacturing cost that is not cheap.

In addition, the known detector mat is designed so that the optical fiber never comes into contact with sharp-edged elements, and thus suffers deformation only by being curved with a large radius of curvature (greater by several order of magnitudes than the diameter of the fiber) and also never suffers from microcurvature on such sharp edges, which could damage the integrity of the optical fiber. Unfortunately, although the fiber is thus protected from localized mechanical damage that could shorten its life, this is achieved at the cost of reducing its sensitivity because of the absence of any microcurvatures that could add their contribution to generating variations in light flux. That detector mat therefore provides sensitivity which is poor, and insufficient for reliably detecting small pressure forces.

OBJECTS AND SUMMARY OF THE INVENTION

According to the invention, to remedy the above drawbacks, the optical fiber is mounted on a support constituted by a thin sheet made of a relatively soft material, the fiber passing from place to place through the support via through holes so as to extend alternately over one face and over the other face of said sheet, taking up an undulating configuration, said sheet fitted with the optical fiber forming an intermediate sheet which is sandwiched between the two above-mentioned main sheets.

Mounting the optical fiber on the intermediate sheet by passing in alternation (regular or otherwise) through the sheet via the above-mentioned holes ensures that the fiber is easily installed and accurately guided along the path which is allocated thereto. Furthermore, the optical fiber is subjected to deformation by microcurvature against the edges of the holes under the effect of a pressure force, but it is not damaged thereby because of the relatively soft material selected to constitute the intermediate sheet. The effect of these microdeformations is added to the effect of the deformations having large radius of curvature, thereby considerably increasing the sensitivity of the detector mat, whereas the absence of sharp elements in contact with the fiber considerably increases the lifetime of the fiber, and thus of the detector mat.

In a preferred embodiment, the two main sheets are connected together by gluing through the intermediate sheet solely in regions where the optical fiber does not pass, without the optical fiber being secured to either of the main sheets at any point. This disposition prevents the optical fiber from being subjected to damaging stresses which in any case would probably contribute very little to generating changes in the light flux transmitted by the fiber.

In such a detector, at least one of the main sheets may be made of a flexible material or of a rigid material. In other words, both main sheets may be flexible, both may be rigid, or one flexible and the other rigid. In general, the use of flexible sheets is appropriate for detecting relatively large pressures whereas the use of rigid sheets makes it possible to detect small pressures.

Provision may be made for the mat made of the two main sheets and the intermediate sheet fitted with the optical fiber to be covered on its face for receiving the application of pressure forces with a cover sheet that is either flexible or rigid. A rigid sheet increases detection sensitivity, particularly when the point at which the pressure force is applied is distant from the optical fiber. A flexible sheet has no effect on sensitivity, but may provide other useful properties (protection against chemical attack, anti-skid effects, etc.).

In a detector mat of the invention, the intermediate sheet may include at least one other optical fiber running along a path adjacent to that of the above-mentioned optical fiber and coupled in like manner to a source of light and to a light receiver. Several variants are then possible, depending on whether all of the optical fibers are associated with a common light source and a common photoreceiver, or whether each optical fiber is associated with its own light source and light receiver pair, or whether each optical fiber is associated with its own light receiver while all of the optical fibers are illuminated by a common light source, or else whether each optical fiber is associated with its own light source, while all of the optical fibers terminate at a common light receiver. Configurations corresponding to combinations of these variants may also be considered. Such dispositions make it possible to provide a detector mat with a plurality of juxtaposed zones having different properties, for example zones of differing sensitivities.

BRIEF DESCRIPTION OF THE DRAWINGS

Other features and advantages of the invention appear from the following description given with reference to the accompanying drawings and relating to non-limiting embodiments.

FIG. 1 is a partially-cutaway diagrammatic plan view of a detector mat of the invention.

FIG. 2 is a section on line II—II of FIG. 1.

FIG. 3 is an exploded perspective view of the FIG. 1 detector mat.

FIGS. 4 to 6 are plan views of various different embodiments of a detector mat of the invention.

MORE DETAILED DESCRIPTION

FIG. 1 shows a pressure detector mat T laid flat on ground S which is hard enough to provide a firm support therefor, e.g. a slab of concrete, a wooden floor, or a compacted earth surface. The mat comprises (see FIGS. 2 and 3) a bottom sheet 1, an intermediate sheet 2, a top sheet 3, and a cover sheet 4. The intermediate sheet 2 is a continuous sheet pierced by a plurality of series of holes 5 in alignment which are regularly distributed at the points of intersection between lines of an imaginary grid. An optical fiber 6 is passed through these holes, passing alternately upwards and downwards through the sheet 2, thus taking up an undulating configuration and extending over the entire sheet 2, following a meandering path (FIG. 1). This sheet, fitted with the optical fiber 6, is sandwiched between the sheets 1 and 3. The cover sheet 4 is placed over the sandwich, and is optional. It may be constituted either by a rigid sheet, thereby modifying the mechanical properties of the mat T, or by a flexible sheet, e.g. having anti-slip properties. At one end of the optical fiber, which may be made of silica or of plastic, there is a light source 7 (e.g. a light-emitting diode) from which the fiber receives light flux. After travelling along the optical fiber, the light is picked up by a photosensitive receiver 8 (e.g. a phototransistor) placed at the other end of the optical fiber.

When a pressure force F is applied to the surface of the mat T, the optical fiber 6 is subjected to deformation that modifies its optical transmission properties and reduces the amount of light energy received at its outlet. The corresponding change in light flux as detected by the receiver 8 indicates that a force F has been applied to the mat. As soon as the force is removed, the mat returns to its natural shape and the optical fiber returns to its rest state, such that the outlet light flux returns to its initial level.

The above-mentioned deformation imparted to the optical fiber 6 includes two kinds of deformation: firstly, it is curved about a large radius of curvature, particularly when a rigid cover sheet 4 is provided; and secondly, the optical fiber is subjected to local deformation at some of the points where it passes through the intermediate sheet 2, thereby giving rise to microcurvature of the fiber where it comes into contact with the edges of the through holes 5. These two types of angular deformation significantly alter the amplitude of the light flux transmitted to the receiver 8 by the optical fiber 6 from the light source 7.

In the present case, it may be observed that the deformation due to microcurvature is not very stressful to the optical fiber since the fiber is not simultaneously pressed against sharp edges, with this being due to the fact that the material from which the intermediate sheet is made is selected to be soft in consistency, e.g. it may be made of plastic such as PVC, polyethylene, or polypropylene.

In order to be detectable by the mat T, the force F must be applied over the optical fiber 6 or in the immediate proximity thereof if the top sheet 3 is not covered by a rigid sheet 4. If a rigid sheet is present, then the force F may be applied further away from the optical fiber 6, depending on the mechanical characteristics of the materials constituting the various sheets of the mat T.

By varying the rigidity and the thickness of the sheets 1 and 3 between which the optical fiber 6 undulates, and also of the intermediate sheet 2 that supports the optical fiber, or indeed by varying the pitch of the points where the fiber passes from one face to the other of the sheet 2, it is possible to vary the sensitivity range of the pressure sensor mat, and where necessary to give it high sensitivity enabling very low pressure forces to be detected. For example, the pitch of the holes 5 through the intermediate sheet may be about 3 cm, and the thickness of the intermediate sheet may be close to 0.5 mm.

In the mat T as described, it is important for the sheets 1 and 3 to be connected to each other but not to the optical fiber 6 with which they must merely come into contact. This can be achieved by cutting openings 9 out in the intermediate sheet 2 between the meanders of the optical fiber, and also in a marginal zone 10 all around the periphery of the mat. The sheets 1 and 3 are connected together through said openings and in said marginal zone, e.g. by gluing, without such connections acting on the optical fiber itself.

For a narrow mat T, it is not necessary for the optical fiber to follow a sinuous path, and it may follow a rectilinear path (FIG. 4) corresponding with the longitudinal axis of the mat, with the fiber nevertheless continuing to zigzag from side to side of the intermediate sheet via through holes 5. This provides a linear mat that is particularly suitable for counting vehicles running along a road.

When it is desired to make a detector mat of small dimensions, it is possible to make a mat that is square or circular in shape (FIG. 5) with the optical fiber 6 being disposed therein merely round a single circular turn, e.g. with only two through holes 5 in the intermediate sheet.

In practice, the light source 7 and the light receiver 8 may be integrated in the detector mat, or else they may be disposed externally thereto at a distance that is compatible with the attenuation per unit length of the optical fiber 6.

Returning to the case of a detector mat that is rectilinear and that is large in size, it is also possible to provide a structure derived from that of FIG. 4 in which a plurality of distinct optical fibers 6a, 6b, . . ., are disposed along adjacent sinuous paths or adjacent paths that are rectilinear and parallel as shown in FIG. 6, each path extending between a light emitting device 17 and a light receiving device 18. The light emitting device 17 may be constituted either by a group having the same number of distinct light emitters as there are optical fibers 6a, 6b, . . ., with each emitter being allocated to its own fiber, or else by a group of a number of light emitters that is smaller than the number of optical fibers, in which case each emitter is allocated to one or more optical fibers, or finally by a single light emitter illuminating all of the optical fibers in common. The same applies for the light receiving device, which may in like manner comprise one or more groups of distinct receivers or a single common receiver. It will thus be understood that it is possible to provide various zones of different sensitivities within the same detector mat. Such a detector mat may be used, for example, for ensuring safety in the vicinity of a machine that is dangerous, by providing successive zones that correspond to increasing security levels and that a person walking over the mat towards the machine must pass through in succession.

The receiver 8 or each of the receivers in a device 18 is coupled to an electronic circuit that compares the output signal delivered thereby with a threshold value. At rest, the signal is greater than the threshold value, and it drops below the threshold value when a pressure force F is applied to the mat T, thereby causing the electronic circuit to deliver a signal that manifests the application of the force F. In a variant, the electronic circuit may be designed to deliver its signal when the output signal from a receiver 8 associated with the mat and normally lower than the threshold value because a force F is normally permanently applied to the mat, exceeds said value by increasing because the force F has been reduced or removed. This disposition makes it possible to detect when an object that used to be standing on the mat has been removed, e.g. in the event of the object being stolen. The electronic circuit may also include a plurality of thresholds making it possible to distinguish between greater or lesser intensities of the force F as applied to the mat.

I claim:

1. A fiber-optic pressure detector, including a mat which comprises two superposed main sheets between which an optical fiber runs following a path that has no fiber-fiber crossovers, the optical fiber is operatively associated with a source of light and with a light receiver such that the receiver receives the light flux transmitted by the optical fiber from the light source so as to indicate the changes therein due to deformation of the optical fiber caused by the application of a pressure force to the mat, thereby enabling said force to be detected, the optical fiber of the detector is mounted on a third sheet made of a material softer than the optical fiber, the optical fiber passing from place to place through the third sheet via through holes so as to extend alternately over one face and over the other face of said third sheet, in an undulating configuration, said third sheet with the optical fiber mounted thereon forming an intermediate sheet which is sandwiched between the two main sheets.

2. A detector according to claim 1, wherein the two main sheets are connected together by gluing through the intermediate sheet solely in regions where the optical fiber does not pass, without the optical fiber being secured to either of the main sheets at any point.

3. A detector according to claim 1, wherein at least one of the main sheets is made of a flexible material.

4. A detector according to claim 1, wherein at least one of the main sheets is made of a rigid material.

5. A detector according to claim 1, wherein the mat made of the two main sheets and the intermediate sheet fitted with the optical fiber is covered on its face for receiving the application of pressure forces, with a cover sheet that is either flexible or rigid.

6. A detector according to claim 1, wherein the intermediate sheet includes at least one other optical fiber running along a path adjacent to that of the optical fiber and coupled in like manner to a source of light and to a light receiver.

7. A detector according to claim 6, wherein said light source and said light receiver are common to all of the optical fibers.

8. A detector according to claim 6, wherein each of the optical fibers is associated with its own light source and light receiver pair.

9. A detector according to claim 6, wherein each optical fiber is associated with its own light receiver, and said light source is common to all of the optical fibers.

10. A detector according to claim 6, wherein each optical fiber is associated with its own light source, and said light receiver is common to all of the optical fibers.

* * * * *